United States Patent [19]

Miller

[11] Patent Number: 5,434,845
[45] Date of Patent: Jul. 18, 1995

[54] INFREQUENT EVENT TRACE

[75] Inventor: Philip N. Miller, Falls Church, Va.

[73] Assignee: General Signal Corporation, Stamford, Conn.

[21] Appl. No.: 197,464

[22] Filed: Feb. 16, 1994

Related U.S. Application Data

[63] Continuation of Ser. No. 801,922, Dec. 3, 1991, abandoned.

[51] Int. Cl.[6] .................................................. H04J 3/14
[52] U.S. Cl. ...................................... 370/13; 358/406; 371/16.5; 375/224
[58] Field of Search ............... 370/13, 13.1, 17, 105.1; 375/10; 371/5.1, 5.2, 5.3, 5.5, 16.2, 16.3, 16.5, 57.2, 60, 61, 62; 358/406, 425

[56] References Cited

U.S. PATENT DOCUMENTS

| | | | |
|---|---|---|---|
| 4,622,666 | 11/1986 | Graves et al. | 370/105.1 |
| 4,730,313 | 3/1988 | Stephenson et al. | 371/5.5 |
| 4,775,957 | 10/1988 | Yakuwa et al. | 371/62 |
| 5,101,402 | 3/1992 | Chiu et al. | 370/17 |
| 5,138,616 | 8/1992 | Wagner, Jr. et al. | 371/5.5 |
| 5,255,208 | 10/1993 | Thakore et al. | 371/16.5 |
| 5,276,529 | 1/1994 | Williams | 358/406 |
| 5,285,442 | 2/1994 | Iwamura et al. | 370/17 |

*Primary Examiner*—Douglas W. Olms
*Assistant Examiner*—Shick Hom
*Attorney, Agent, or Firm*—Barnes & Thornburg

[57] ABSTRACT

Protocol analysis is performed by identifying frame events of communication frames from a communication link, and determining which frame events have an occurrence below a preselected frequency. The results are displayed. The frame events having an occurrence below the preselected frequency are determined by counting the occurrence of each type of frame event for a preselected period and comparing against a count of the preselected periods. The frame event may be any of the plurality of data fields for a communication frame, the occurrence of a sequence or pairs of communications frames, or the time periods between pairs of communication frames.

20 Claims, 12 Drawing Sheets

TYPICAL PROTOCOL TEST SYSTEM ARCHITECTURE

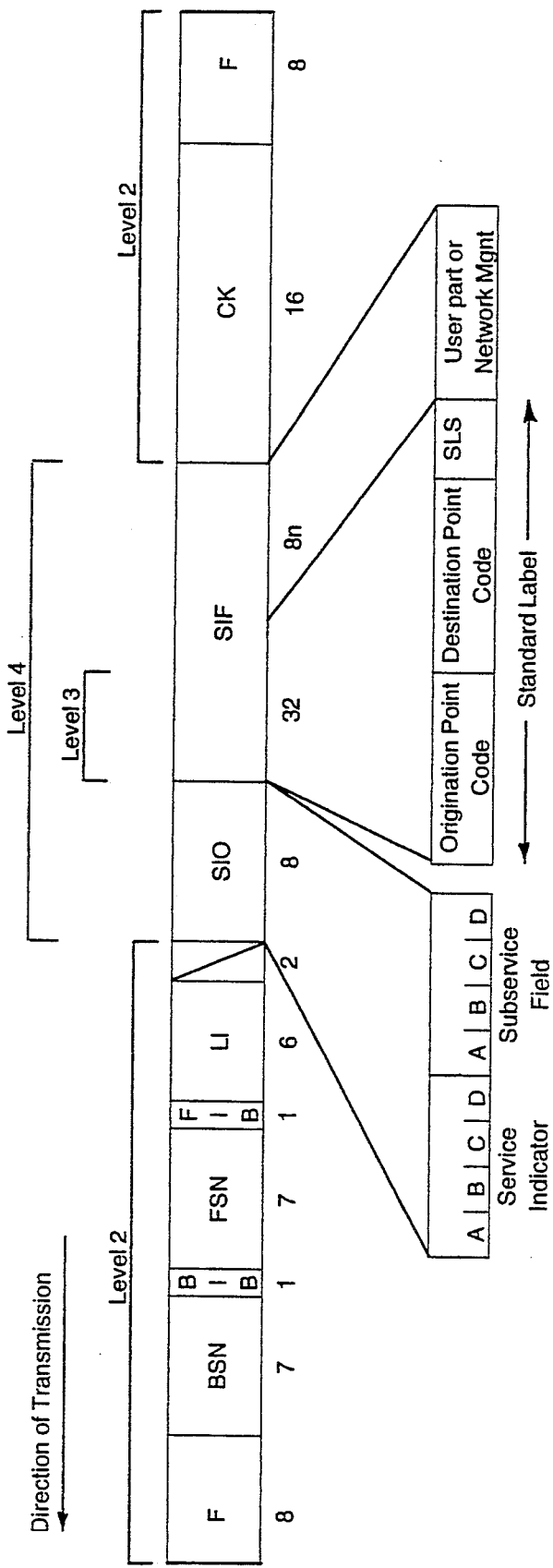
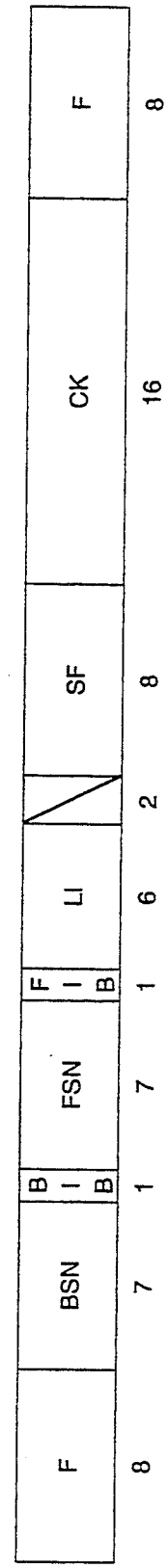
FIG. 3A
Message Signal Unit (MSU)
FIG. 3B
Link Status Signal Unit (LSSU)

Single-Line Trace

| *MON/LINE/T1/Ch24* | | BLK= | | 07/04/91 15:24 | | | |
|---|---|---|---|---|---|---|---|
| DPC | OPC | CIC | SI | DTE | DCE | P | TIME BCC |
| 252-053-003 | 252-053-006 | 100 | I | | COT | 2 | 1524:17.327 |
| 252-053-005 | 252-053-003 | 503 | I | REL | | 2 | 1524:17.336 |
| 252-053-003 | 252-053-013 | 98 | I | | ACM | 1 | 1524:17.337 |
| 252-053-003 | 252-053-006 | 99 | I | | REL | 1 | 1524:17.393 |
| 252-053-004 | 252-053-003 | 80 | I | IAM | | 2 | 1524:17.397 |
| 252-053-003 | 252-053-001 | 7 | I | | RLC | 2 | 1524:17.406 |
| 252-053-012 | 252-053-003 | 10 | I | ACM | | 2 | 1524:17.407 |
| 252-053-003 | 252-053-001 | 33 | I | | IAM | 2 | 1524:17.420 |
| 252-053-006 | 252-053-003 | 100 | I | ACM | | 1 | 1524:17.426 |
| 252-053-012 | 252-053-003 | 30 | I | REL | | 1 | 1524:17.437 |
| 252-053-005 | 252-053-003 | 231 | I | REL | | 2 | 1524:17.438 |
| 252-053-006 | 252-053-003 | 99 | I | RLC | | 1 | 1524:17.451 |
| 252-053-003 | 252-053-004 | 80 | I | | ACM | 1 | 1524:17.452 |
| 252-053-003 | 252-053-010 | 24 | I | | IAM | 2 | 1524:17.466 |
| 252-053-010 | 252-053-003 | 61 | I | IAM | | 2 | 1524:17.476 |
| 252-053-001 | 252-053-003 | 33 | I | ACM | | 2 | 1524:17.477 |
| F1 | F2 | F3 | F4 | F5 | F6 | F7 | F8 |
| SINGLE | MULTI | FILTER | | | | | |

*FIG. 4*

```
*MON/LINE/T1/Ch24*      BLK=        07/04/91    15:24                    001 101 011

Network cluster: 53
        Network ID: 252
        Origination point code
        Network cluster member: 6
        Network cluster: 53
        Network ID: 252
        Signalling link selection: 24
        Circuit identification code: 100
        Message type: continuity
        Continuity indicators
            Continuity check successful: yes
─────────────────────────────────────────────────────────────────── Time=1524:13.664
DTE   Port 2   Frame length=19
Backward sequence number: 2
Backward indicator bit: 1
Forward sequence number: 123
Forward indicator bit: 1
 F1     F2      F3       F4       F5       F6       F7       F8
SINGLE MULTI  FILTER            TRUNK   EXPAND
```

*FIG. 5*

```
*MON/LINE/T1/Ch24*    BLK=        07/04/91   15:24

SS#7 Filter Menu

Filter mode:       FILTER TO DISPLAY
Port Condition:    NONE
Discrepancy Cond:  NONE
Service Menu:      ISUP
Menu Enabled:      YES
Point Code 1:      _ _ _ : _ _ _ : _ _ _
Point Code 2:      _ _ _ : _ _ _ : _ _ _
CIC:               _ _ _ _
Message Type:      NONE
Field:             CAUSE CLASS
Value:             INVALID MESSAGE
Follow-up Action:  FILTER FOR TRUNK
```

| F1 | F2 | F3 | F4 | F5 | F6 | F7 | F8 |
|----|----|----|----|----|----|----|----|
| SINGLE | MULTI | FILTER | | | | | |

FIG. 6

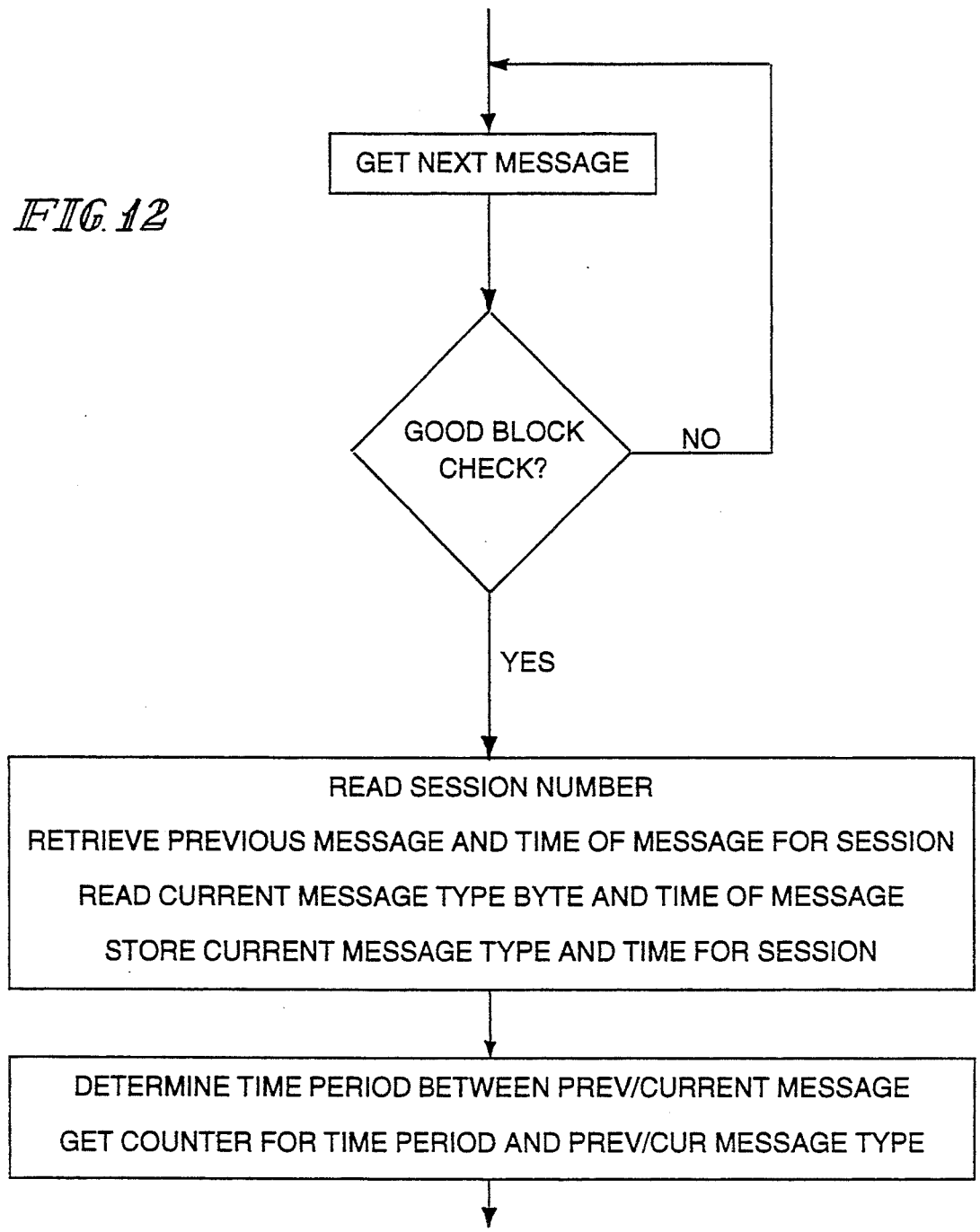

INFREQUENT EVENT TRACE

This is a Continuation of application Ser. No. 07/801,922, filed Dec. 3, 1991 now abandoned.

BACKGROUND AND SUMMARY OF THE INVENTION

The present invention relates generally to protocol analyzers for communication links and more specifically to a device and method for improving the protocol analysis.

Protocol analyzers/emulators are used for installing a communication network, fixing troubles in existing communications networks, improving network performance or developing protocol-oriented products. The protocol analyzer/emulator can monitor a circuit, trace exchanges of commands and responses between network devices, analyze performance or interactively emulate a device. Protocol analyzers/simulators handle complex protocols and interfaces such as T1, ISDN, G.703, SS#7, SDLC, SNA and X.25.

A typical application for a protocol analyzer in public and private networks is illustrated in FIG. 1. Although the end users are shown as computer centers, these may also be telephones or other communication instruments. In the public telephone network the end-users are connected by voice or data lines to the central office (CO). The COs are interconnected by telephone company trunks which are voice and dam lines. The COs are also interconnected by signaling links, possibly using the SS#7 protocol. The major control points in the SS#7 network are signal transfer points (STP's) and service control points (SCPs). Both STP's and SCP's are physically located at the CO's. STPs are interconnected to each other and to the SCP's by signaling links. The protocol analyzer may be connected to any of the data, voice, or signalling links to perform monitoring as well as emulation.

Protocol analyzers analyze communication links between two instruments during the connection, data transfer and disconnection portions of communication. This communication uses specific rules known as a protocol. The protocol includes rules governing successful connection, identification, information exchange, error recovery and disconnection. This information is contained in message units called "frames". Depending upon the system, the network control information is on a common line with dam signal units and/or voice; or on a separate control or signaling link. A primary task of a protocol analyzer is to divide every meaningful frame into parameters or fields and present it as decoded information to the operator.

To prevent the operator from being swamped with all this information, protocol analyzers have filters to select and display preselected information. In the standard approach to filtering, the user would be able to specify a particular message type (for example, "reset circuit" or "call progress"), or address, or release cause (examples: "call rejected" or "destination out of order"), and filter for these messages/addresses/causes exclusively. A frame would only be displayed if it matched the selected message type or address or cause. Thus, the user must know the specific event that he is looking for in order to have the protocol analyzer selectively display the information.

In addition, the protocol analyzer might provide a screen for the values of counters wherein each counter counts each possible message type. Another screen might be filled with another set of counters, with each counter representing a particular "release cause."

In the SS#7 protocol, the message type and release cause would be the first two fields (and quite possibly the only two fields) that a protocol analyzer would be likely to support with filters and counters. The message type and release cause fields are only two fields out of over 500 protocol fields in SS#7, any one of which is potentially important to the success of a particular call setup, or to the health of the signalling link in general.

Most troublesome problems are intermittent. The operator has no pre-warning such that they can count the values of a particular field, or to filter for a particular value. Once a problem occurs during the operation of a system, the operator must visually search through all the display data, looking for any event that is out of the ordinary.

Also, to design appropriate filters to detect specific messages, message types or fields of interest, requires a knowledge of the specific protocol being monitored. Some operators may not be as familiar as others with the protocol therefore they may not be able to design an appropriate filter to detect problems. Thus, the infrequent event concept brings potential problems to the attention of the operator. Once the operator has been made aware of a problem, he can then investigate the problem and determine whether it is appropriate or inappropriate within the protocol being used.

Thus it is an object of the present invention, to provide a protocol analyzer which is capable of detecting infrequent frame events.

Another object of the present invention is to provide a protocol analyzer which keeps a count of every value in every field and reports events on the basis of infrequency.

A further object of the present invention is to provide a protocol analyzer which detects the occurrence of values of a plurality of fields of the communication frame as an infrequent event.

An even further object of the present invention is to provide a protocol analyzer which detects as an infrequent event the occurrence of sequence of pairs of communication frames.

A still even further object of the present invention is to provide a protocol analyzer which detects as an infrequent event the occurrence of ranges of time periods between pairs of communication frames.

These and other objects are achieved by identifying frame events of communication frames from a communication link, and determining which frame events have an occurrence below a preselected frequency. The results are displayed. The frame events having an occurrence below the preselected frequency are determined by counting the occurrence of each type of frame event for a preselected period. This count is compared against a count of the preselected periods. If the counted occurrences are below the count of the preselected periods, this determines a frame event having an occurrence below the preselected frequency.

The communication frames have a plurality of data fields and the frame event is the occurrence of each value of the dam field, which is counted. In another embodiment, the frame event may be the occurrence of a sequence of pairs of communications frames. Thus each specific sequence of previous and current message types or frames is counted and compared with the period count. In another embodiment, the frame event is the occurrence of time periods between pairs of communication frames. The lapsed time between specific sequences of frames is counted as belonging to a particular time range and compared with the period count.

The protocol analyzer is capable of receiving and storing communication frames for offline analysis and may be connected to a communication link and perform real time identification. The protocol analyzer is portable and operable in any mode.

Other objectives, advantages and novel features of the present invention will become apparent from the following detailed description of the invention when considered in conjunction with the accompanying drawings.

BRIEF DESCRIPTION OF THE DRAWINGS

FIGS. 3A and 3B are diagrams of the field structure of the various frames or "signal units" in SS#7.

FIG. 4 is a display of a single line trace.

FIG. 5 is a display of a multi-line trace.

FIG. 6 is a display of a filter menu.

FIG. 12 is a flow chart of the GET NEXT EVENT operation of FIG. 9, wherein the NEXT EVENT is a period of time between a particular sequence of two messages.

BEST MODE OF CARRYING OUT THE INVENTION

Before describing the present invention, a brief description of a typical protocol analyzer system architecture and protocol architecture will be described to lay a foundation.

Signaling System Number 7 (SS#7) will be the described protocol. This is one of many protocols which are available and is used only as an example.

Figure 1:
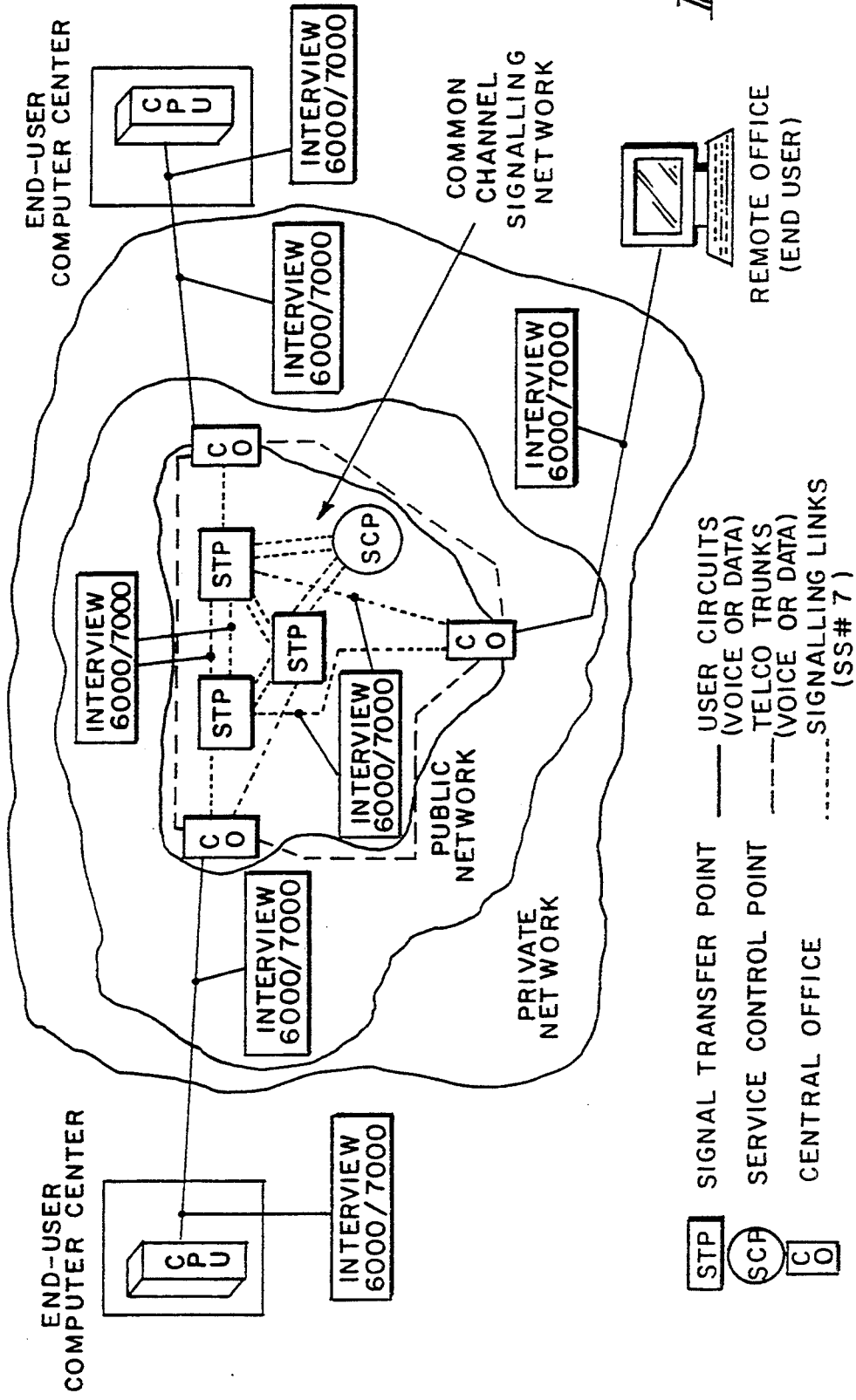
FIG. 1 is a graphical representation of a protocol analyzer in a public and private network.
Figure 2:
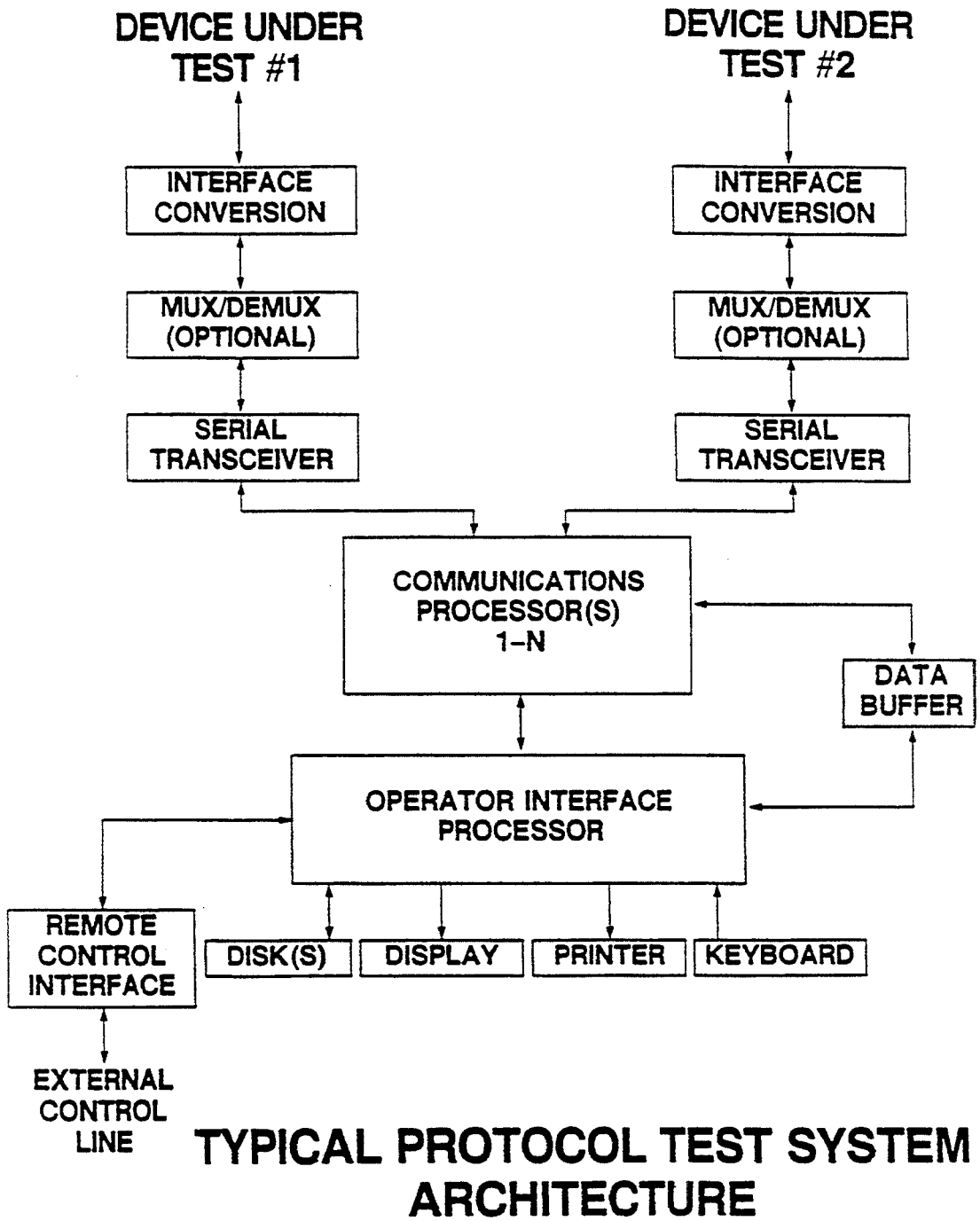
FIG. 2 is functional block diagram for a protocol analyzer.

A protocol analyzer architecture as illustrated in FIG. 2 is connected to a device under test by an interface conversion section. This allows the protocol test system to interface with the communication link to be tested and either monitor only or to monitor and emulate separately or in combination. In the monitor mode, the protocol test system bridges the link or circuit under test with a non-intrusive, high impedance interface. The protocol test system monitors both the transmit and receive side of the line simultaneously. In the emulate mode, the test system terminates the circuit to the device under test and generates all the required signals for the device being tested.

The interface conversion section must support multiple wide area network interfaces and/or local area network interfaces either through modular interface modules or multiple interfaces built into the system. The interface conversion section may be connected to the serial transceiver by a multiplexer/demultiplexer. The multiplexer/demultiplexer (MUX/DEMUX) enables the protocol test system to interface with time division multiplexer information. The serial transceivers convert the serial format for the device under test to parallel format for the test system and conversely, converts the parallel format of the test system to serial format for communication with the device under test. Different from other transceivers, the transceiver of the protocol test system captures information normally lost by standard transceiver systems. These include flag characters and synchronization characters.

The communications processor controls the transceivers and performs the detailed real-time analysis necessary for a protocol test system. The communications processor can vary between one or more discrete processors depending upon the number of lines being tested, the speed of the lines being tested, and the level of sophistication of the analysis to be performed. In a simple protocol test system, a single processor is used both for the communication processor as well as the operator interface processor. More sophisticated systems use at least a separate communications processor and an operator interface processor to keep up with the high speed requirement of a real-time analysis system.

The operator interface processor interfaces between the external peripheral devices attached to the system and the internal raw data. In some cases, the operator interface processor performs some level of post-processing on the data captured by the communications processor.

A data buffer stores information that the communication processor receives from the device under test. The data buffer capacity may vary from several thousand to several million bytes of memory.

A remote control interface is provided and connected to the operator interface processor to provide access to a protocol test system at an unattended remote location. The remote control interface is used to set up and control the test system and then to upload the collected data test results. The peripheral devices connected to the operator interface processor includes one or more disk drives to store the operating software, the application, the collected raw data and the analysis results. Also shown are a display, a printer and a keyboard.

A typical example of a protocol test system meeting the architecture of FIG. 2 is INTERVIEW 6000 and 7000 series protocol analyzers and emulators available from Telenex, AR Test Systems of Springfield, Va.

A typical example of frames or signal units in an SS#7 format are illustrated in FIGS. 3A and 3B.

Each of the signal units begin and end with a Flag Field F. The next four fields handle the flow control and the error control mechanisms. The backward sequences number (BSN) contains the number of the last signal unit correctly received. The backward indicator bit (BIB) indicates negative acknowledgement. The new value of BIB is maintained in the subsequent signal units until another error is detected. The forward sequence number (FSN) is uniquely numbered sequentially. The forward indicator bit (FIB) indicates if the signal is new or a retransmission. The FIB is inverted to indicate retransmission of a negatively acknowledged message signal unit. The link indicator (LI) specifies the number of octets of the upper level fields and the signal unit type. The next two bits are filler. The second to the last field is the check bits (CK).

A message signal unit MSU as illustrated in FIG. 3A, includes the service information octet (SIO) and the signalling information field (SIF). The SIO and SIF fields contain information treated as data to be transferred on the link. The SIO contains the service indicator subfield which defines the user and message type and a sub service field which is related to national and international networks. The SIF contains the information on the source and designation node addresses, routing information, and user or network management data.

A link signal service unit (LSSU), as illustrated in FIG. 3B, contains the same first seven fields and the last two fields as the message signal unit (MSU). The eighth field is a status field (SF) to provide user data across the link. The LSSU is used for line initialization, alignment and flow control. Typical examples of status fields are "busy", "normal alignment" and "out-of-service".

A line trace would display the origin and destination of the frame and its message type as illustrated in FIG. 4. The destination point code (DPC), the origin point code (OPC) and the circuit identification code (CIC) are displayed as a number. The service indicator (SI) and the message type mnemonic and origin are represented as DTE and DCE respectfully. Also displayed is the port by which the message was detected P, the time in milliseconds and the block check calculation (BBC) status.

Reviewing FIG. 4 will indicate that the information being displayed includes entries which are sometimes a thousandth of a second apart. The sixteen line display covers a span of 0.15 seconds. Thus, the display changes very quickly. Because of the constant updating of information, the operator may be unable to isolate problems that occur intermittently.

If the operator should spot a single line entry of interest, he can obtain additional information by freezing the display which enables the machine to go into the buffer and display the additional information. By going to Function F2 MULTI, a multi-line trace of the individual frames is produced as illustrated in FIG. 5. Each of the subfields of the message is displayed. The size of each message decode is dependent on the number of fields and sub-fields presented in the message type. The information on the display in FIG. 5 is self explanatory and will not be explained in detail.

Monitoring the scrolling display of FIG. 4 or the complete display of FIG. 5 by hand is an ineffective way to trouble- shoot. To reduce the amount of information displayed, prior art devices have used filters to select specific messages which indicate trouble to be displayed.

In the standard approach to filtering on a protocol analyzer, the user is able to specify a particular message type (eg., "reset circuit" or "call progress") or address and filter for these messages/addresses exclusively. A frame would only be displayed if it matched the message type or address. Thus the user must know the specific event that he is looking for in order to have the protocol analyzer selectively display the information. This requires knowledge of the protocol unless only very basic filtering is desired. In the case of a troublesome problem, the operator may have no way of knowing the cause of the problem and therefore may not know for what to filter. Thus in the prior art, the operator must visually search through all the dam of FIG. 4 for an event or sequence that could have caused the problem.

Using the SS#7 Advance Trace (Bellcore) available from Telenex, AR Test Systems, one can select to filter real-time data to the display or the buffer, freeze the real-time data buffer on the trigger event or refilter the data for the display.

For example, the filter includes origination/destination point codes, port conditions, discrepancy conditions, (bad/aborted frames and message sequence errors), circuit ID code, message type, release cause, and several other fields available for selective filtering. FIG. 6 shows the display for a filter menu to allow composition of the filter definition.

The problem with the specifically configured filter is that in many cases an event that indicates a problem cannot be predicted. The protocol analyzer may not be configured to detect this event, or the operator may not be trained to look for it. Infrequent events are by their nature elusive. But an infrequent event may still be catastrophic to the system.

Thus the present system is designed with a filtering system known as the infrequent event filter system. "Event" means a protocol or frame event such as a particular value for a given field in the data frame, a particular sequence of frames or fields or the time period between specific types of frames or fields, for examples. "Infrequent" means that the event occurs at or below a preselected frequency.

For example, the present system monitors every decodable field in each frame for all of the possible values. Each time any value occurs, that value is counted and it is determined if it occurred at the preselected frequency. For example, the event count is compared to a minute counter. If the value has not occurred at least once per minute, this specific decodable field is highlighted and displayed to the operator. While it is true that not all significant events are infrequent, many or most of them are; and it should be noted that if an event is occurring frequently, it will be more easily detected from just browsing the mass of data illustrated for example in FIG. 4.

One method of implementing the infrequent event filter is to provide a counter for each possible value of the event. Each time that an event occurs, the associated counter is incremented. A time signal generator also has a counter associated therewith and increments the time counter for each occurrence of a time signal. Those event counters that have a count lower than the time counter are considered infrequent events and are displayed to the operator. The counting and comparison may be made within the communication processor or operator interface processor, or they may be made by dedicated hardware counters and comparators.

Figure 7:
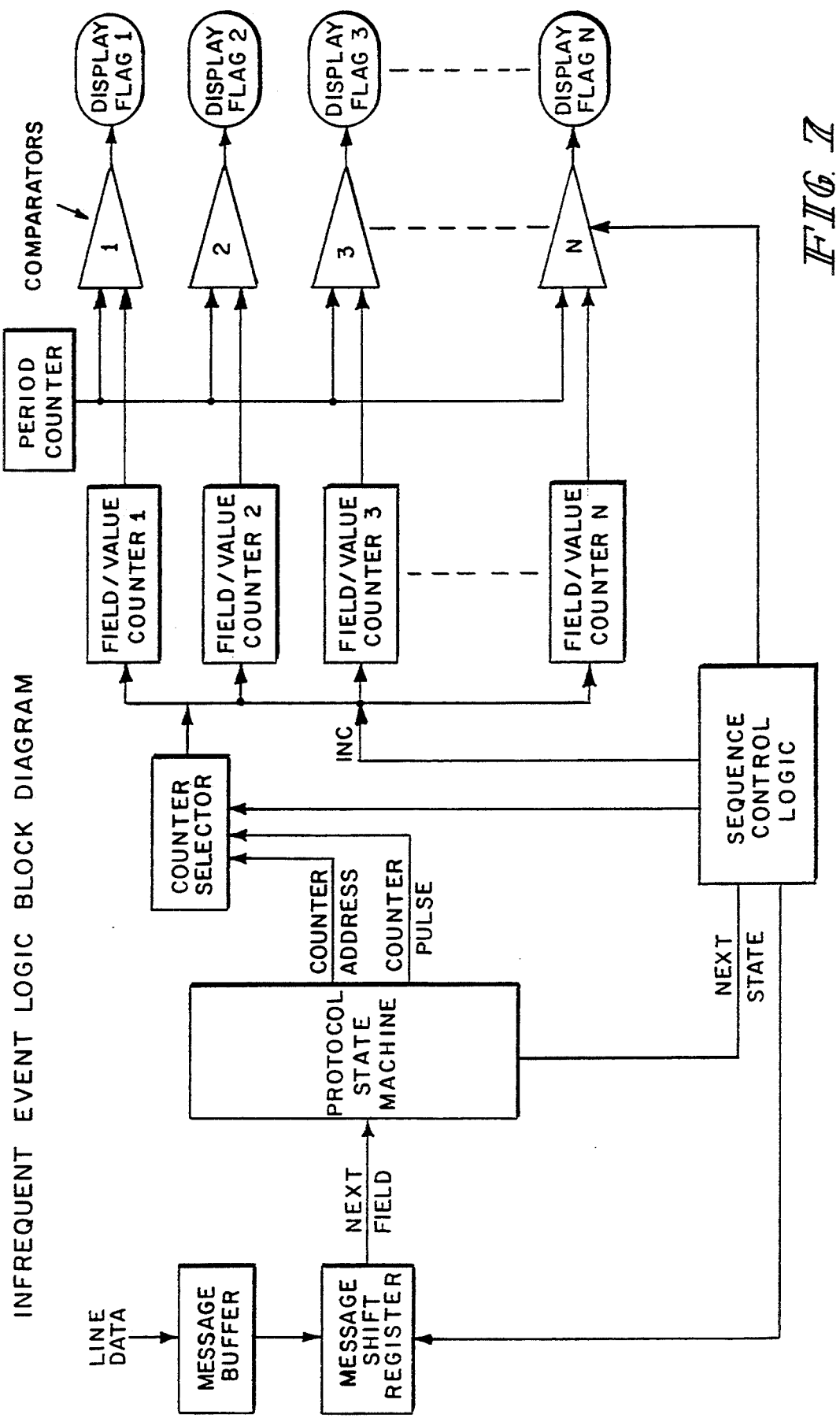
FIG. 7 is a block diagram of an infrequent event system incorporating the principles of the present invention.

A typical example of dedicated hardware is illustrated in FIG. 7. The data from the communication line either in real time or previously collected are imputed through a massage buffer to the message shift register. The output of the message shift register is connected to a protocol state machine. The output of the protocol state machine is a counter address and a counter pulse connected to a counter selector. The output of the counter selector provides an enable pulse to one of a plurality of counters. For the example shown there is one counter for each value of each field of the frame or message unit. The output of the individual counters are connected to individual comparators where it is compared with a period counter. For the example discussed above, the period is one minute and the counter counts one minute pulses. The output of the comparators provide display flags to drive a display indicating the counter identification and the contents of the counter. A sequence control logic provides sequencing of the message shift register, provides a next state signal to the protocol state machine and provides control signals to the counter selector and an increment signal to the selected counter.

Figure 8:
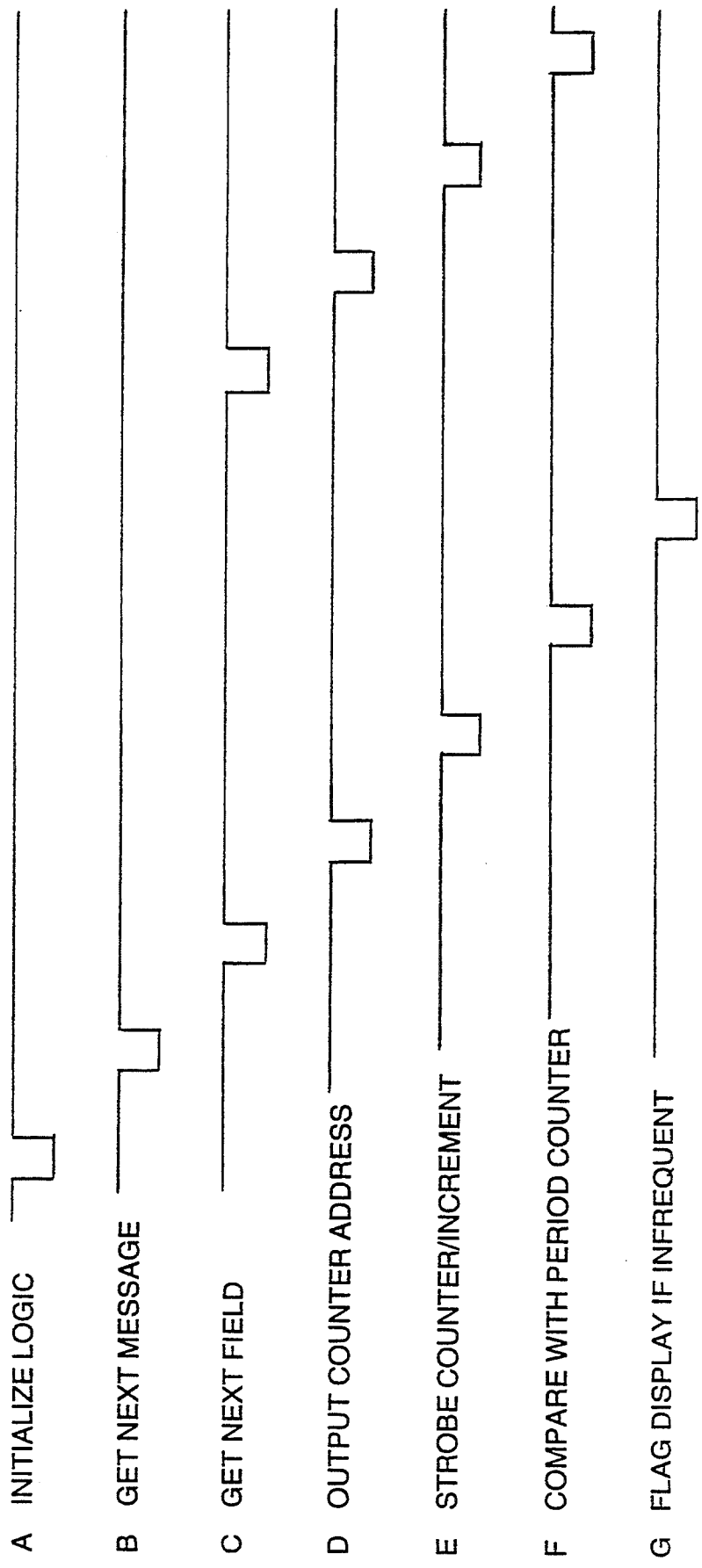
FIG. 8 is a timing diagram for the infrequent event system of FIG. 7.

The timing signals are illustrated in FIG. 8 as including an initialize logic signal at Graph A. Graph B illustrates the GET NEXT MESSAGE signal followed by the GET NEXT FIELD signal illustrated in Graph C. One or more GET NEXT FIELD signals will occur before the next command for the GET NEXT MESSAGE signal is transmitted. This is followed by the output counter address signal in Graph D and strobe or increment the counter signal in Graph E. The compare signal of Graph F enables the comparators and may result in a flag display if it is determined that is infrequent. As illustrated in Graph F, the first sequence provides a flag display for infrequent signals where the second sequence does not. FIGS. 7 and 8 are only examples of one logic system which implements the present invention.

The results of using the infrequent event filter of the present invention are illustrated in Table 1 for a twenty-minute period. Within this twenty-minute period, 98 infrequent events have been noted. The first 16 events occurred over a period of two minutes and 24.5 seconds. By comparison, note the 16 events illustrated in FIG. 4; which, when no filter was used, represent a span 0.15 seconds. Thus, substantially less extraneous information is presented to the operator by the infrequent event trace. This allows the operator more time to view the occurring events as well as to call up individual screens, as in FIG. 5, for any one of the displayed events.

TABLE 1

| INFREQUENT EVENT | COUNT | TIME |
| --- | --- | --- |
| Network ID: international network | 1 | 2210:37.088 |
| Parameter: [78] | 1 | 2210:49.941 |
| Parameter [247] | 1 | 2210:55.315 |
| Parameter [137] | 1 | 2210:56.130 |
| Message type: call progress | 1 | 2210:57.484 |
| Parameter: call reference | 1 | 2211:01.636 |
| Identifier: query with permission | 1 | 2211:11.739 |
| Identifier: response | 1 | 2211:14.327 |
| Event: call forwarded on no reply | 1 | 2211:32.838 |
| Identifier: query with permission | 2 | 2211:45.589 |
| Identifier: response | 2 | 2211:48.078 |
| Message type: pass-along | 1 | 2211:49.381 |
| Message type: reset circuit | 1 | 2211:57.170 |
| Parameter: redirection information | 1 | 2212:45.046 |
| Global title included: yes (type only) | 1 | 2212:51.635 |
| Subsystem: CLASS | 3 | 2212:51.635 |
| Identifier: national TCAP operation code | 3 | 2212:51.940 |
| Identifier: conversation with permission | 1 | 2212:52.054 |
| Message type: reset circuit | 2 | 2212:56.548 |
| Event: call forwarded unconditional | 2 | 2213:10.320 |
| Parameter: carrier selection information | 1 | 2213:21.177 |
| Message type: pass-along | 2 | 2213:32.901 |
| Identifier: busy/idle status | 3 | 2213:50.876 |
| Parameter: [137] | 3 | 2213:55.718 |
| Identifier: national TCAP operation code | 4 | 2213:58.050 |
| Busy/idle status: idle | 2 | 2213:58.150 |
| Specifier: dequeue call | 1 | 2213:58.172 |
| Identifier: echo data | 3 | 2214:02.358 |
| Identifier: echo data | 4 | 2214:06.035 |
| Parameter: [137] | 4 | 2214:17.687 |
| Parameter: [126] | 1 | 2214:20.910 |
| Calling party category: [161] | 2 | 2216:02.434 |
| Parameter: connected number | 2 | 2216:02.704 |

TABLE 1-continued

| INFREQUENT EVENT | COUNT | TIME |
| --- | --- | --- |
| Identifier: echo data | 5 | 2216:31.156 |
| Message type: reset circuit | 3 | 2216:53.651 |
| Global title included: yes (type only) | 2 | 2217:08.110 |
| Busy/idle status: busy | 2 | 2217.09.111 |
| Family: send notification | 2 | 2217:09.209 |
| Identifier: conversation with permission | 2 | 2217:09.315 |
| Message type: pass-along | 3 | 2217:12.184 |
| Busy/idle status: idle | 3 | 2217:46.465 |
| Presentation: restricted | 1 | 2217:53.488 |
| Family: parameter | 4 | 2217:54.222 |
| Busy/idle status: busy | 3 | 2217:54.222 |
| Family: send notification: | 3 | 2217:54.741 |
| Identifier: conversation with permission | 3 | 2217:54.856 |
| Message type: pass along | 4 | 2218:00.576 |
| Busy/idle status: idle | 4 | 2218:20.627 |
| Family: parameter | 5 | 2218:24.286 |
| Busy/idle status: idle | 5 | 2218:24.417 |
| Specifier: dequeue call | 2 | 2218:24.582 |
| Message type: reset circuit | 4 | 2218:46.976 |
| Called party category: payphone | 3 | 2219:08.447 |
| Presentation: restricted | 2 | 2219:39.894 |
| Message type: pass-along | 5 | 2220:00.271 |
| Identifier: echo data | 6 | 2220:06.073 |
| Parameter: [47] | 1 | 2220:30.473 |
| Message type: pass-along | 6 | 2220:30.703 |
| Parameter: [137] | 7 | 2220:35.057 |
| Causes: call rejected | 1 | 2221:03.613 |
| Message type: pass-along | 7 | 2221:05.765 |
| Cause: call rejected | 2 | 2221:18.827 |
| Cause: call rejected | 3 | 2221:29.811 |
| Parameter: [124] | 1 | 2221:33.023 |
| Parameter: [137] | 8 | 2221:35.591 |
| Parameter: redirection information | 2 | 2221:55.794 |
| Presentation: restricted | 3 | 2222:09.385 |
| Message type: call progress | 5 | 2222:09.490 |
| Parameter: [115] | 1 | 2222:15.313 |
| Cause: call rejected | 4 | 2222:18.175 |
| Called party category: payphone | 4 | 2222:46.332 |
| Identifier: echo data | 7 | 2222:48.113 |
| Message type: pass-along | 8 | 2222:50.479 |
| Message type: pass-along | 9 | 2222:50.479 |
| Message type: pass-along | 10 | 2223:21.901 |
| Parameter: suspend/resume indicators | 1 | 2223:34.085 |
| Parameter: [137] | 9 | 2223:48.860 |
| Message type: call progress | 6 | 2223:54.768 |
| Identifier: echo data | 8 | 2224:00.125 |
| Message type: pass-along | 11 | 2225:02.015 |
| Parameter: transmission medium requirement | 1 | 2225:41.246 |
| Identifier: echo data | 9 | 2226:06.378 |
| Identifier: echo data | 10 | 2226:14.164 |
| Parameter: call reference | 2 | 2226:46.517 |
| Message type: pass-along | 12 | 2226:57.804 |
| Parameter: calling party category | 1 | 2227:46.291 |
| Parameter: [137] | 10 | 2227:52.653 |
| Identifier: echo data | 11 | 2228:02.955 |
| Coding standard: other international standard | 1 | 2228:48.290 |
| Parameter: [216] | 1 | 2228:52.865 |
| Parameter: [137] | 11 | 2228:56.097 |
| Parameter: redirection information | 4 | 2229:25.882 |
| Message type: call progress | 7 | 2229:27.240 |
| Parameter: [148] | 1 | 2229:46.707 |
| Parameter: [137] | 12 | 2229:50.198 |
| Parameter: call reference | 3 | 2230:01.609 |
| Cause: destinate out of order | 1 | 2230:14.425 |
| Cause: destinate out of order | 2 | 2230:36.890 |
| Message type: pass-along | 13 | 2230:54.689 |
| Routing basis: global title | 1 | 2231:26.510 |
| Identifier: response | 20 | 2231:26.868 |
| Identifier: echo data | 12 | 2231:30.738 |
| Calling party category: [161] | 3 | 2231:38:258 |
| Parameter: connected number | 4 | 2231:38.447 |
| Called party category: payphone | 5 | 2231:50.431 |
| Identifier: echo data | 13 | 2232:05.190 |
| Parameter: call reference | 4 | 2232:23.170 |
| Global title included: yes (type only) | 4 | 2232:32.872 |
| Identifier: busy/idle status | 17 | 2232:33.039 |
| Identifier: national TCAP operation code | 17 | 2232:33.039 |
| Identifier: conversation with permission | 4 | 2232:33.039 |
| Presentation: restricted | 4 | 2232:44.828 |

TABLE 1-continued

| INFREQUENT EVENT | COUNT | TIME |
| --- | --- | --- |
| Message type: call progress | 8 | 2233:19.258 |
| Parameter: [125] | 1 | 2233:25.423 |
| Parameter: [137] | 13 | 2233:28.889 |
| Message type: call progress | 9 | 2233:30.023 |
| Message type: call progress | 10 | 2233:36.480 |
| Identifier: echo data | 14 | 2233:47.806 |
| Parameter: [131] | 1 | 2234:39.690 |
| Parameter: information request indicators | 1 | 2234:43.521 |
| Message type: reset circuit | 5 | 2234:51.437 |
| Presentation: restricted | 5 | 2235:18.343 |
| Message type: call program | 11 | 2235:18.469 |
| Parameter: [131] | 2 | 2235:24.122 |

The infrequent event display includes the type of event, the number of times that event has occurred during the program run to date and the time of the receipt of the effected message.

For example, the first infrequent event type "message type: call progress" occurs at 2210:57.484. This signifies that a message sent by switch B to tell switch A that a call has been redirected to switch C. By the time 2223:54.768 or approximately thirteen minutes, six message types of "call progress" have occurred. At time 2212:45.046, the event is a "parameter: redirect information." Switch B is telling switch C that a call originated at switch A. At time 2217:53.488, the event "presentation: restricted" occurred for the first time. This indicated that the calling party has requested that his phone number not be displayed to a called party. At time 2217:54.741 the infrequent event is "family: send notification" has occurred for the third time. Switch A asks switch B to send notification when a particular switch B party is free. At time 2219:08.447, the event "party category: pay phone" has occurred for the third time. Here the call switch tells the calling switch that a particular number is tied to a pay phone.

Any unusual release cause will be displayed. For example at time 2221:03.613, the infrequent event occurring for the first time is "cause: call rejected". Approximately 15 seconds later is the second occurrence of the event call "cause call rejected" occurring at 2221:18.827. Similarly, the last two entries in the table are the infrequent events "cause: destination out-of-order". These occur approximately 22 seconds apart.

Table 1 also includes fields which have no alpha translation and are shown "Parameter:" followed by a number. For example, Parameter: [137] has occurred seven times at time 2220:35.057 or approximately ten minutes after its first infrequent occurrence at 2210:36.130. This parameter may be a legal parameter having no alpha representation or may be illegal in the specific protocol. The detection of infrequent events is independent of protocol, only the translation into alpha display is protocol specific.

Figure 9:
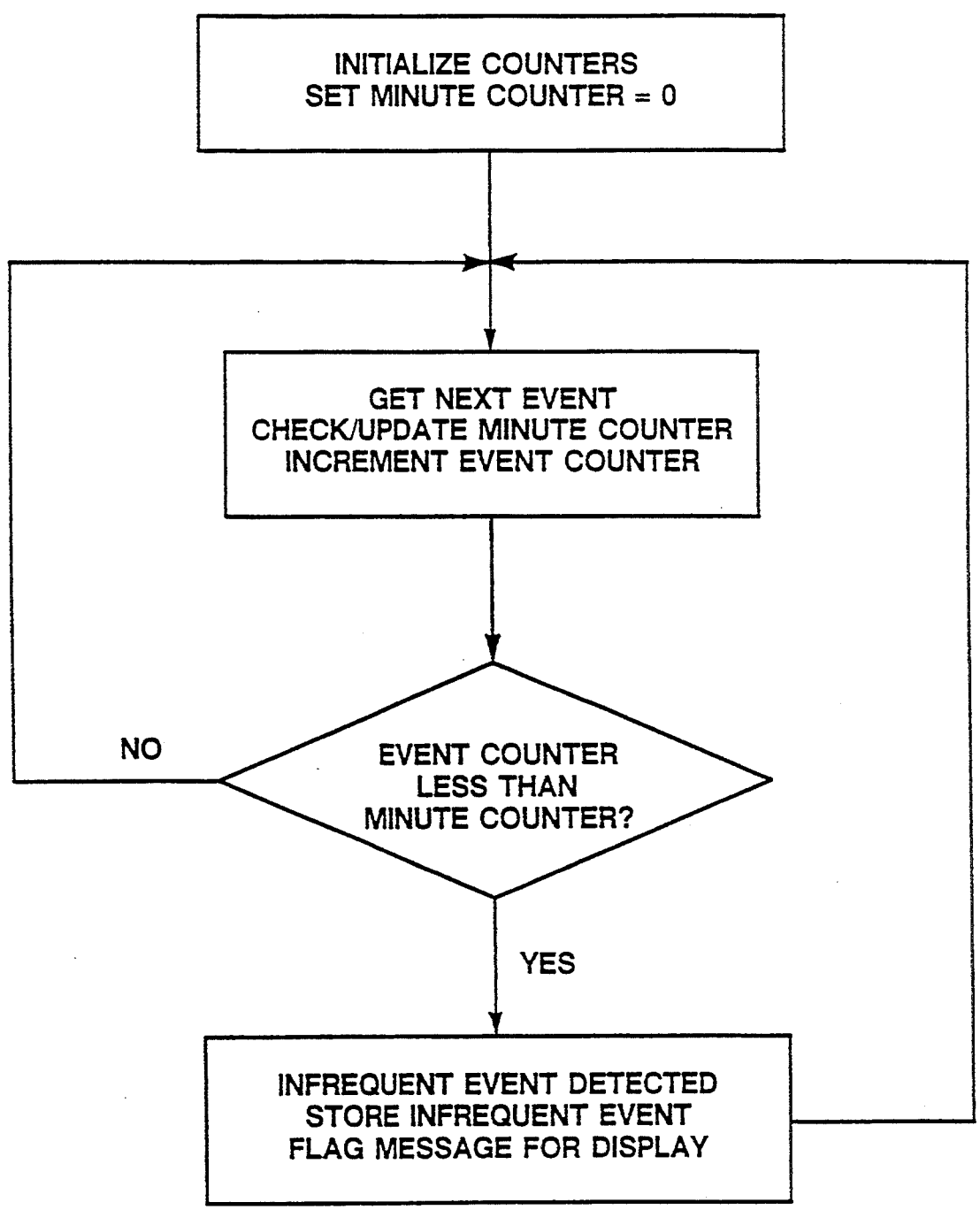
FIG. 9 is a flow chart of a method to determine infrequent events, incorporating the principles of the present invention.

A flow chart showing the method for the infrequent event filter is illustrated in FIG. 9. The method begins with initialization of the event counters and setting of the time counter to zero. After initialization, the first event is obtained and the time counter is updated if required by the passage of a preselected time period. In our discussion so far, the meaning of "event" has been any one value of a given field in the protocol; but the definition of event can include other protocol events such as the occurrence of a particular sequence of frames or fields or the time of occurrence between specific types of frames or fields, for example. The main flow chart for "Infrequent Event Trace" in FIG. 9 does not specify the kind of event being counted. The flow chart merely shows generic functions like "get next event" and "increment event counter".

Figure 10:
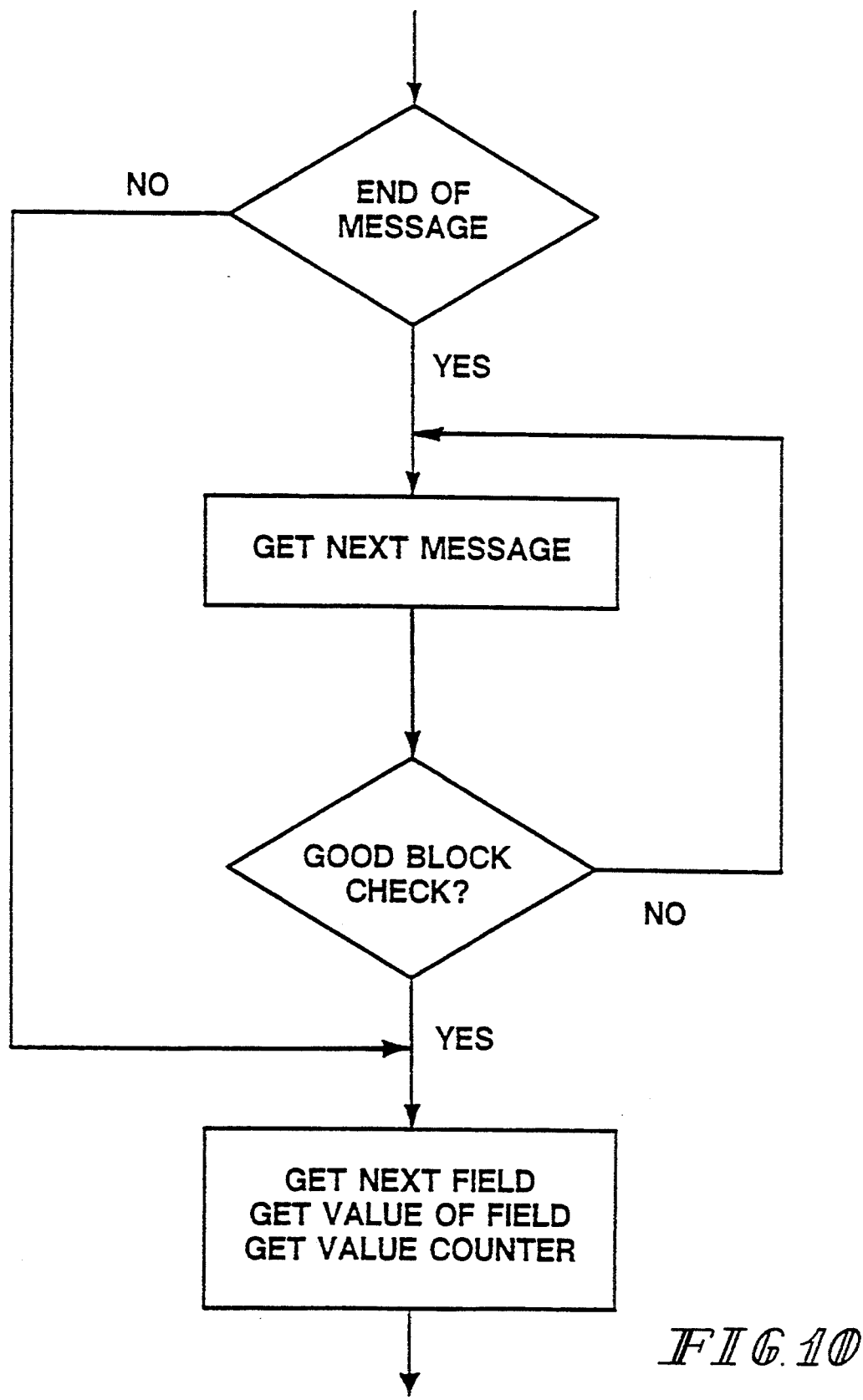
FIG. 10 is a flow chart of the GET NEXT EVENT operation of FIG. 9, wherein the NEXT EVENT is a particular value of a field.
Figure 11:
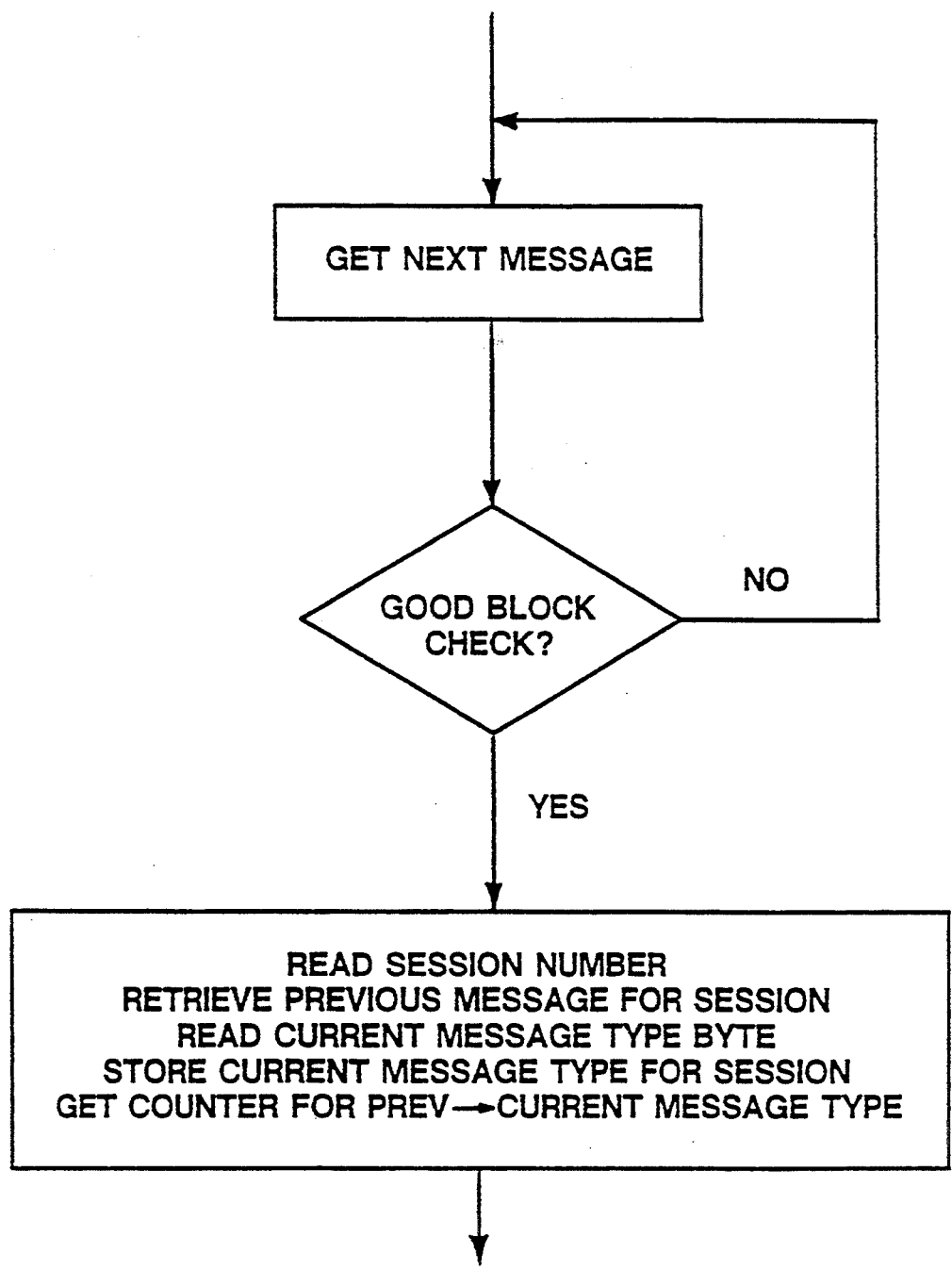
FIG. 11 is a flow chart of the GET NEXT EVENT operation of FIG. 9, wherein the NEXT EVENT is a particular sequence of two messages.

Examples of events that might be monitored via the infrequent event trace are given in the flow charts in FIGS. 10, 11 and 12, which are really call-outs of the GET NEXT EVENT function in the main flow chart, FIG. 9. The kind of event illustrated in FIG. 10, titled "Get Next Event (Field Value)", is field value. This is the event we have been using in all of our examples. A field is a group of bits that have meaning according to published specification of protocol. For example, in the SS#7 protocol, there are 500 fields with approximately 11,000 associated values. Thus in order to support the SS#7 protocol, there are 11,000 counters or memory locations needed.

Initially, it is determined if it is the end of a message or frame. If it is, the next message is obtained and checked. Then the next field is obtained. Once a field is obtained, the current value of that field is derived from the line data, and the counter dedicated to that one specific value is accessed. This is the event counter.

For example, the current field may be Message Type which is an eight bit field requiring 256 counters for each distinct value. The current value for that field may be the number 7. In that case, the number 7 counter is the event counter identified.

The event counter identified in FIG. 10 is incremented in FIG. 9. Next, a determination is made of whether the event counter is lower than the time counter. If the field-value counter is lower than the time counter, then an infrequent event is detected, stored, and displayed to the operator.

Since frames occur at a greater frequency than the time period set for the counter, the period is checked during each flow through the loop to pick up the message, but the period or minute counter is incremented less frequently. For the present example, the timing signal is set for 60 seconds, but can be shorter or longer. If the time period is too long, too few events will be classified as infrequent events. If the time period is too short, too many events will be classified as infrequent events.

Where the next event is a message type sequence, "Get Next Event" uses the diagram of FIG. 11. The next message is obtained and checked. The previous message type in that session is obtained and the present message type is stored. A counter representing the sequence of the previous followed by the current message type is identified. This counter is incremented in FIG. 9 and compared with the period or minute counter to determine an infrequent event. A typical example of an event which occurs infrequently and is of concern is an "acknowledge" message that was not preceded by a "request" message. This occurring infrequently would indicate that a specific connection is not being completed. There may be a problem with equipment or protocol.

Another protocol event to be monitored is the time period between specific message types or frames. Using the previous example, a determination is made of the time between a "request" message and an "acknowledge" message. The time may be subdivided into different ranges, for example every ten seconds. If thirty-seconds is acceptable, this event (the 30 second time range) should be occurring frequently. The infrequent occurrence of 10, 20, 40 and 50 seconds will be reported as infrequent for this sequence and their rate of infrequency displayed. Thus the health of the system can be monitored.

The flow diagram for the "Get Next Event" where the event is a period between frames is illustrated in FIG. 12. After obtaining the message and checking the block, the session number is read. The previous message and its time of occurrence for that session is retrieved. The current message type bit and time of the occurrence of the message is read and stored for that session. The time period between the previous and the current message is determined. Based on the results of this determination, an appropriate counter is obtained for that time period and that message sequence of the previous to the current message type. Thus a plurality of time counters are provided for each specific message sequence between the previous and the current. The selected counter is incremented in the flow chart of FIG. 9 and a determination is made of whether it is an infrequent event.

As can be seen from the flow charts of FIGS. 9-12, the determination of an infrequent event is independent of protocol. All infrequent events are displayed and the operator will determine whether the infrequent event is of concern reflecting a problem with the system or an unhealthy situation. The identification of the infrequent event and the determination of its infrequency are protocol independent. The translation of the infrequent event into the displayable text is protocol dependent. If the number of infrequent events determined for message type sequence or period between frames produces too many infrequent event, knowledge of the protocol can be used at reduced to further or refine the infrequent event. Thus the system has provided detection and display of events which are of concern to the user independent of protocol knowledge.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A protocol analyzer for a communication link comprising:
   input means for receiving communication frames from a communication link, said communication frames having plural identifiable distinctive frame events;
   first filter means for identifying a plurality of said distinctive frame events, from said input means, each of which has an occurrence below a preselected frequency; and output means for selectively displaying only the plurality of distinctive frame events identified by said first filter means.

2. A protocol analyzer according to claim 1, wherein said first filter means includes a plurality of first counter means for counting the occurrence of each kind of frame event.

3. A protocol analyzer according to claim 2, wherein said first filter means includes timer means for generating a time signal defining said preselected frequency.

4. A protocol analyzer according to claim 3, wherein said first filter means includes:
   a timer counter means for counting said time signals; and
   comparator means for comparing the count in said timer counter means and in said first counters means to perform said identification.

5. A protocol analyzer according to claim 2, wherein said communication frames includes a plurality of data fields, and said first counter means includes a plurality of field counter means for counting the occurrence of each value of selected data fields.

6. A protocol analyzer according to claim 1,
   including buffer means for storing communication frames from said input means;
   wherein said first filter means identify frames in said buffer means; and
   wherein said output means also outputs all frames in said buffer means.

7. A protocol analyzer according to claim 6,
   including second filter means for identifying preselected flames from said buffer means; and
   wherein said output means includes selection means for selecting as an output results of said first filter means, results of said second filter means or all flames in said buffer means.

8. A protocol analyzer according to claim 1, wherein said input means includes means for connecting said protocol analyzer to said communication link.

9. A protocol analyzer according to claim 8, wherein said first filters means perform identification in real time.

10. A protocol analyzer according to claim 9, wherein said protocol analyzer is portable.

11. A protocol analyzer according to claim 1, wherein said first filter means identifies as said frame events the occurrence of values of a plurality of data fields of said communication frames.

12. A protocol analyzer according to claim 1, wherein said first filter means identifies as said frame events the occurrence of sequences of pairs of communication frames.

13. A protocol analyzer according to claim 1, wherein said first filter means identifies as said frame events the occurrence of ranges of time periods between pairs of communication frames.

14. A method of protocol analysis comprising:
   identifying a plurality of distinctive frame events in communication frames from a communication link, said communication frames having plural identifiable distinctive frame events;
   determining a plurality of identified distinctive frame events which each has an occurrence below a preselected frequency; and
   selectively displaying only the determined frame events.

15. A method according to claim 14, wherein said determining includes counting the occurrence of each frame event for a preselected period and determining which identified frame events have an occurrence below a preselected frequency from the count of the counting step.

16. A method according to claim 15, wherein said determining further includes counting said preselected periods and comparing the counted preselected periods with the counted occurrences.

17. A method according to claim 15, wherein:
   said communication frames each include a plurality of data fields;
   said identifying includes identifying values of data fields; and
   said determining includes counting the occurrence of each value of selected data fields for said preselected period.

18. A method according to claim 14, wherein said communication frames each include a plurality of data fields; and said identifying includes identifying, as said frame events, the occurrence of values of a plurality of data fields of said communication frames.

19. A method according to claim 14, wherein said communication frames occur in sequence; and said identifying includes identifying, as said frame events, the occurrence of sequences of pairs of communication frames.

20. A method according to claim 14, wherein said communication frames occur in sequence; and said identifying includes identifying, as said frame events, the occurrence of time periods between pairs of communication frames in said sequence.

* * * * *